US 6,956,706 B2

United States Patent
Brandon

(10) Patent No.: US 6,956,706 B2
(45) Date of Patent: Oct. 18, 2005

(54) COMPOSITE DIAMOND WINDOW

(76) Inventor: John Robert Brandon, Lislunnan, Northbrook, Micheldever, Winchester, Hampshire (GB)

(*) Notice: Subject to any disclaimer, the term of this patent is extended or adjusted under 35 U.S.C. 154(b) by 194 days.

(21) Appl. No.: 10/240,655

(22) PCT Filed: Apr. 2, 2001

(86) PCT No.: PCT/IB01/00545

§ 371 (c)(1),
(2), (4) Date: Mar. 10, 2003

(87) PCT Pub. No.: WO01/75500

PCT Pub. Date: Oct. 11, 2001

(65) Prior Publication Data

US 2003/0188681 A1 Oct. 9, 2003

(30) Foreign Application Priority Data

Apr. 3, 2000 (GB) ............................................. 0008051

(51) Int. Cl.⁷ .......................... G02B 27/00; G02B 5/00; G02B 7/00
(52) U.S. Cl. ....................... 359/894; 372/103; 378/140; 378/161
(58) Field of Search .................. 359/894; 372/103, 372/108; 378/161, 140; 117/84

(56) References Cited

U.S. PATENT DOCUMENTS

| 3,949,263 A | * | 4/1976 | Harper ........................ 315/3.5 |
| 5,111,491 A | * | 5/1992 | Imai et al. .................... 378/35 |
| 5,258,091 A | * | 11/1993 | Imai et al. .................... 216/12 |
| 5,335,245 A | | 8/1994 | Marie et al. |
| 6,580,781 B2 | * | 6/2003 | Bachmann et al. ......... 378/161 |

FOREIGN PATENT DOCUMENTS

| EP | 0 476 827 | 3/1992 |
| JP | 03005701 | 1/1991 |
| JP | 06289145 | 10/1994 |
| WO | WO 01/16051 | 3/2001 |

* cited by examiner

Primary Examiner—Leo Boutsikaris
(74) Attorney, Agent, or Firm—Burns, Doane, Swecker & Mathis, L.L.P.

(57) ABSTRACT

The invention concerns a composite diamond window (10) which includes a CVD diamond window pane (12) which is mounted to a CVD diamond window frame (14). The frame (14) is thicker than the pane (12) and has a radiation transmission aperature (16) therein across which the pane spans.

14 Claims, 1 Drawing Sheet

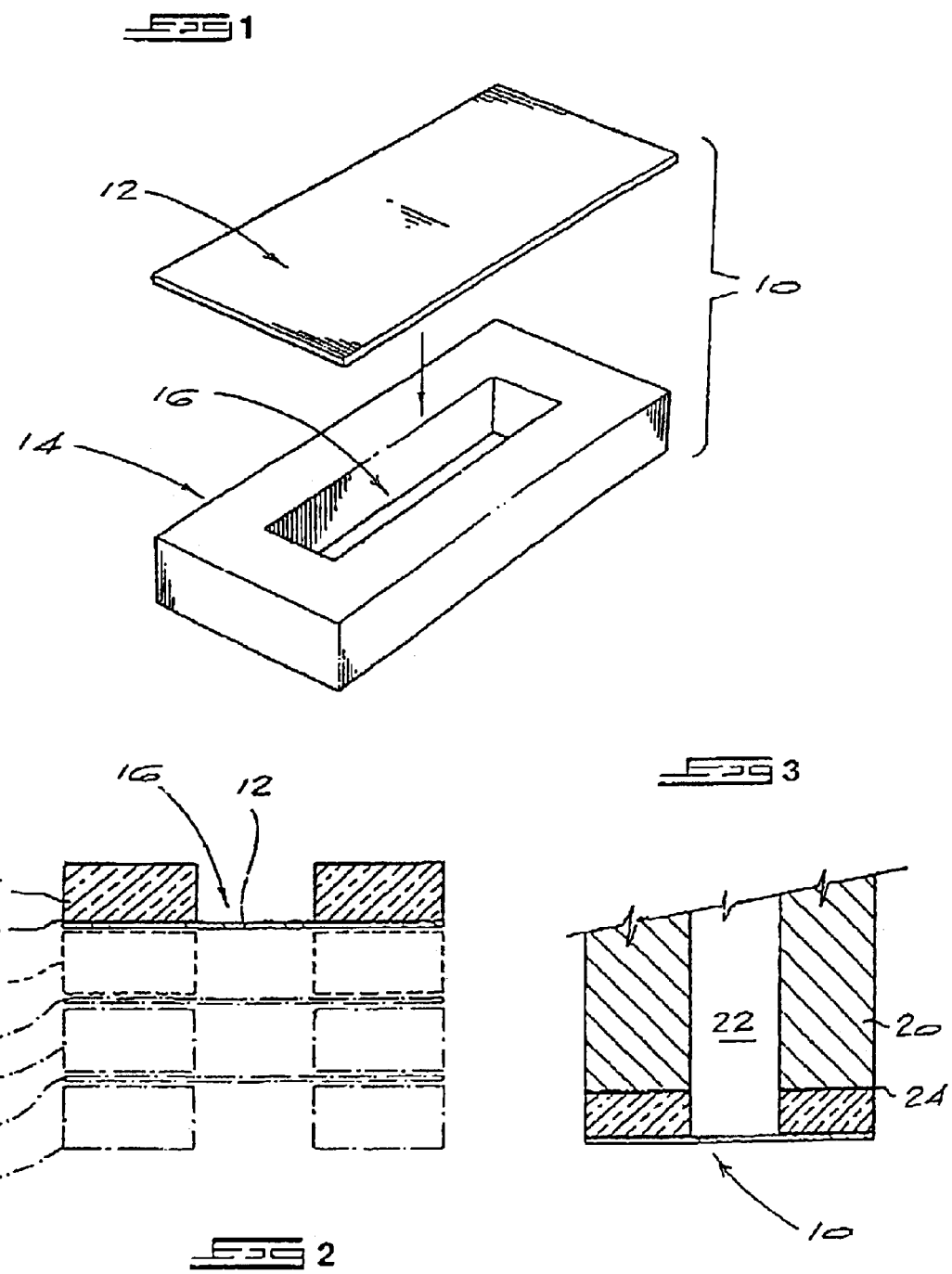

COMPOSITE DIAMOND WINDOW

BACKGROUND TO THE INVENTION

THIS invention relates to a composite diamond window.

There is a requirement in high power radiation sources, such as laser, synchrotron, RF or X-ray sources, for windows or viewports which are transparent to the radiation and able to withstand substantial pressure differentials across them. It has been proposed to make the required window out of diamond because of the high radiation transparency, high thermal conductivity, low expansion coefficient and low power absorption of diamond.

In the window construction, the window is generally mounted in sealed manner to a metal substrate or frame. It is however recognised that the initial high temperature bakeout of the radiation source and subsequent thermal cycling thereof will give rise to a substantial thermal mismatch between the diamond and the metal frame, particularly where the diamond is relatively thin, which may degrade the seal. In attempts to counter this problem, it has been proposed to mount a CVD diamond (i.e. diamond formed by chemical vapour deposition) window to its metal frame, typically of copper or stainless steel, by means of liquid solders, metal brazes and diffusion bonds. Such attempts have however been unsuccessful in view of the high stresses caused by the large thermal expansion mismatch between the diamond and metal.

The applicant's co-pending British patent application 9920384.6 filed on Aug. 28, 1999 and entitled "Joining of CVD Diamond Bodies to Metal Structures" proposes that a CVD diamond window be mounted to a metal frame via an intermediate ceramic body, typically of silica. The diamond window is bonded to the intermediate body and the intermediate body is, bonded to the metal. This has the advantage that the ceramic can have thermal expansion characteristics which are compatible with those of the diamond, thereby reducing the severity of the thermal mismatch between the diamond and metal.

SUMMARY OF THE INVENTION

According to one aspect of the present invention there is provided a composite diamond window comprising a CVD diamond window pane mounted to a CVD diamond window frame, the frame being thicker than the pane and having a radiation transmission aperture therein which is spanned by the pane.

The window pane may be bonded to one surface of the window frame.

Alternately, the window pane could be sandwiched between and bonded to a pair of window frames.

As yet another alternative, there could be multiple window panes and frames with each pane sandwiched between and bonded to two frames.

The thickness of the window pane will typically be $200 \times 10^{-6}$ m or less.

The CVD of the window pane may be of a relatively high optical grade and that of the window frame of a relatively low optical grade.

The bond between window pane and window frame may be by way of a relatively hard braze or diffusion bond such as a titanium diffusion bond or aluminium-based braze.

According to another aspect of the invention, there is provided a diamond window mounting comprising a diamond window as summarised above and a metal frame, itself typically connected to the housing of a laser, RF or X-ray radiation source, to which the window frame is bonded.

Bonding in this case may for instance be by way of a soft metal braze or diffusion bond.

BRIEF DESCRIPTION OF THE DRAWINGS

The invention will now be described in more detail, by way of example only, with reference to the accompanying drawings in which:

FIG. 1 shows an exploded perspective view of a diamond window according to this invention;

FIG. 2 shows a cross-sectional view of the assembled diamond window; and

FIG. 3 shows how the diamond window is mounted to a metal frame.

DESCRIPTION OF PREFERRED EMBODIMENTS

The drawings show a composite diamond window 10 according to this invention. The window 10 includes a CVD diamond window pane 12 having a thickness of $200 \times 10^{-8}$ m or less and a CVD diamond window frame 14 having a substantially greater thickness than the pane 12. The pane 12 is rectangular in shape. The frame 14 is also rectangular and includes a central, rectangular window aperture 16.

Referring to FIG. 2, the window pane 12 is bonded to the window frame, so as to span over the aperture 16, by means of a titanium diffusion bond 18. In this embodiment, the external dimensions of the frame are the same as those of the pane. In other embodiments, the window pane may have smaller dimensions than the frame, provided that there is sufficient contact area between the pane and the frame to ensure that a vacuum tight seal is obtained.

In practice and for the purpose of containing the cost of the diamond window 10, the CVD diamond of which the window pane 12 is made will typically be of a higher optical and thermal grade than the CVD diamond of which the frame is made.

As shown in dashed outline in FIG. 2, it is within the scope of the invention for the window 10 to include a second window frame 14.1 with the window pane 12 sandwiched between and bonded to the frames 14 and 14.1.

In chain-dot outline, FIG. 2 also illustrates an embodiment which includes a series of further window panes 12.1, 12.2 . . . and further window frames 14.2, 14.3 . . . , with each window pane sandwiched between two adjacent frames and bonded to those frames.

FIG. 3 shows how the diamond window 10 can be mounted to a metal frame 20 having a radiation transmission aperture 22. The frame 20 is typically made of copper or stainless steel and is mounted to a housing (not shown) of a radiation source such as a synchrotron radiation source. The window pane is placed against the metal frame 20 with the window frame 14 bounding the transmission aperture 22. The window frame is bonded to the metal frame by means of a soft metal braze or diffusion bond 24.

It will be understood that in use of the radiation source served by the window 10, radiation is transmitted through the transmission aperture 22 and window pane 12. It does not pass through the window frame 14.

In the window 10, the relatively thin CVD diamond window pane 12 has high transparency to the radiation.

Despite its small thickness it is able to withstand radiation-generated heat because it benefits from the ability of the relatively thick CVD diamond window frame 14 to remove heat from it and conduct that directly into the metal frame 20. The window frame therefore operates as a heat sink for the window pane and alleviates the thermal mismatch which would exist between a thin diamond window pane and a metal frame or substrate which are bonded to one another directly.

EXAMPLE

A polycrystalline CVD diamond optical quality layer with low dielectric loss was grown in a microwave reactor to a thickness of approximately 200 μm. From this layer, a rectangular window pane was prepared with lateral dimensions of 22 mm×16 mm and a thickness of 80 μm. Preparation of the window was achieved by using conventional cutting and polishing techniques. A surface $R_A$ of less than 20 nm was achieved.

A second polycrystalline CVD diamond layer of mechanical grade was grown in a microwave reactor to a thickness of approximately 750 μm. From this layer, a rectangular window frame was prepared, with external lateral dimensions of 22 mm×16 mm and a thickness of 500 μm and an internal opening with lateral dimensions of 12 mm×6 mm. Preparation of the frame was completed using conventional cutting and lapping techniques.

The diamond window pane was brazed to the diamond window frame using an aluminium-based braze, thereby forming a composite diamond window according to the invention. The window was designed for use as a synchrotron X-ray exit window for mounting, by means of a soft metal braze, into a copper alloy, water-cooled vacuum compatible frame or flange of the synchrotron.

A vacuum leak test conducted on the composite diamond window assembled in the manner just described demonstrated a leak rate of less than $10^{-9}$ mbar.l.s$^{-1}$.

The composite diamond window manufactured had a thickness of diamond spanning the clear aperture of only 80 μm. This minimises the absorption of high energy X-rays when used in this particular application. Also, the high surface quality of the diamond window pane minimises X-ray phase contrast from the window. The frame provides sufficient rigidity for the further mounting of the composite diamond window onto metal, ceramic or other flange materials, using mechanical or brazing techniques.

This configuration of the composite diamond window of the invention is also optically thin at RF frequencies, making it suitable for use as a broadband RF window in certain applications, for example where the RF frequency is up to 20 GHz or higher.

The use of optical quality diamond for the window made the composite diamond window equally suitable for use as a laser exit window, where the thin window will minimise absorption and scatter of the laser beam, or in similar applications.

What is claimed is:

1. A composite diamond window comprising a CVD diamond window pane bonded by brazing or diffusion bonding to a CVD diamond window frame, the frame being thicker than the pane and bounding a single radiation transmission aperture defined by the frame which is spanned by the pane, the pane having major surfaces which are continuously flat in the radiation transmission aperture.

2. A composite diamond window according to claim 1, the window pane and the window frame being manufactured as separate components which are bonded to one another.

3. A composite diamond window according to claim 2 wherein the window pane is bonded to the window frame in a manner to form a vacuum tight seal between the pane and the frame.

4. A composite diamond window comprising a CVD diamond window pane bonded by brazing or diffusion bonding to a CVD diamond window frame, the frame being thicker than the cane and bounding a single radiation transmission aperture defined by the frame which is spanned by the pane, the pane having major surfaces which are continuously flat in the radiation transmission aperture, and the window pane and window frame being manufactured as separate components which are bonded to one another by a titanium diffusion bond.

5. A composite diamond window comprising a CVD diamond window cane bonded by brazing or diffusion bonding to a CVD diamond window frame, the frame being thicker than the pane and bounding a single radiation transmission aperture defined by the frame which is scanned by the pane, the pane having major surfaces which are continuously flat in the radiation transmission aperture, and the window pane and window frame being manufactured as separate components which are bonded to one another by an aluminium-based braze.

6. A composite diamond window comprising a CVD diamond window pane sandwiched between and bonded by brazing or diffusion bonding to a pair of CVD diamond window frames, each frame being thicker than the pane and bounding a single radiation transmission aperture defined by the frame, the radiation transmission apertures being aligned and spanned by the pane, the pane having major surfaces which are continuously flat across the extent of the aligned radiation transmission apertures, and the window pane and window frames being manufactured as separate components which are bonded to one another.

7. A composite diamond window according to claim 6 comprising multiple window panes and frames with each pane sandwiched between and bonded between two frames.

8. A composite diamond window comprising a CVD diamond window pane bonded by brazing or diffusion bonding to a CVD diamond window frame, the frame being thicker than the pane and bounding a single radiation transmission aperture defined by the frame which is spanned by the pane, the cane having major surfaces which are continuously flat in the radiation transmission aperture, the window pane and window frame being manufactured as separate components which are bonded to one another, and the CVD diamond of which the window pane is made being of a higher optical grade than the CVD diamond of which the window frame is made.

9. A composite diamond window according to claim 2 wherein the thickness of the window pane is $200 \times 10^{-6}$ m or less.

10. A diamond window mounting comprising a composite diamond window according to claim 1 and a metal frame to which the window is bonded.

11. A diamond window mounting according to claim 10 wherein the metal frame is of copper or stainless steel.

12. A diamond window mounting according to claim 10 wherein the window is bonded to the metal frame by means of a soft metal braze or diffusion bond.

13. A diamond window mounting according to claim 10 wherein the metal frame has a radiation transmission aperture therein aligned with the radiation transmission aperture of the window frame.

14. A diamond window mounting according to claim 10 wherein the metal frame is connected to the housing of a laser, RF or X-ray radiation source.

* * * * *